No. 856,453. PATENTED JUNE 11, 1907.
H. T. DUNSTONE.
KETTLE LID.
APPLICATION FILED MAR. 12, 1907.

Witnesses

Inventor
Harry T. Dunstone.
By Milo B. Stevens & Co.
Attorneys

UNITED STATES PATENT OFFICE.

HARRY TREVARE DUNSTONE, OF HUBBELL, MICHIGAN.

KETTLE-LID.

No. 856,453.            Specification of Letters Patent.            Patented June 11, 1907.

Application filed March 12, 1907. Serial No. 361,904.

*To all whom it may concern:*

Be it known that I, HARRY TREVARE DUNSTONE, a citizen of the United States, residing at Hubbell, in the county of Houghton and State of Michigan, have invented certain new and useful Improvements in Kettle-Lids, of which the following is a specification.

This invention is a lid for kettles and the like, and has for its object an improved hinge connection, and also a handle having a buffer to prevent damage to the kettle when the lid is thrown open.

Figure 1:
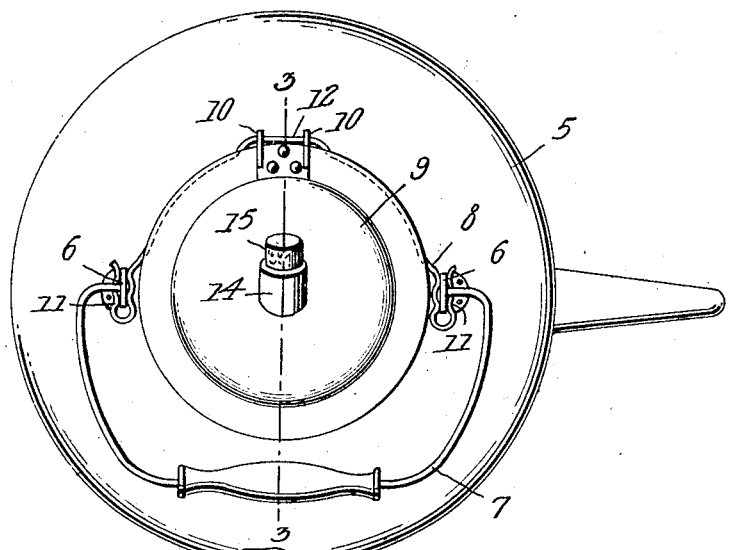
Figure 2:
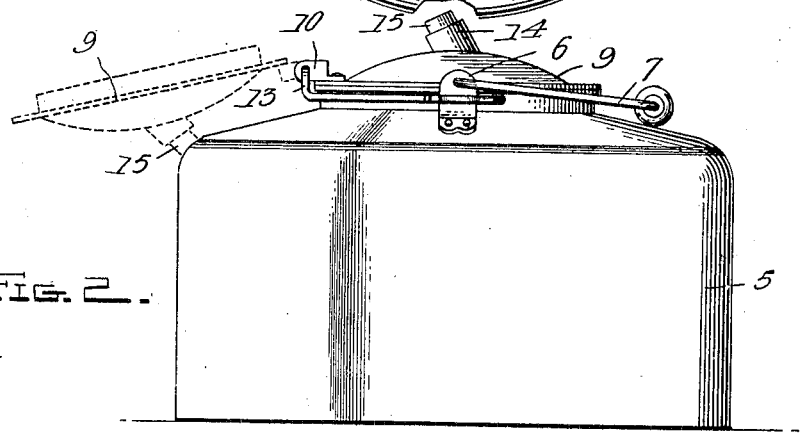
Figure 3:
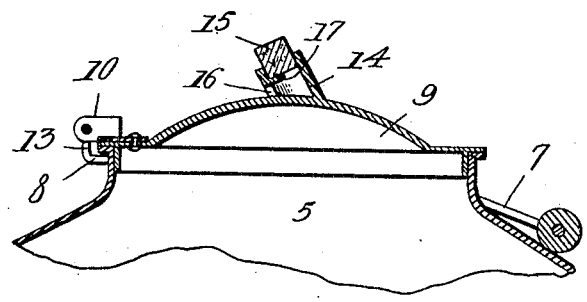

In the accompanying drawing, Figure 1 is a plan view showing the application of the invention. Fig. 2 is a rear elevation thereof. Fig. 3 is a vertical section on the line 3—3 of Fig. 1.

Referring specifically to the drawing, 5 denotes a tea kettle or other vessel having ears 6 for attachment of the handle or bail 7. At the top of the kettle is attached a piece of strong spring wire 8, to which the lid 9 is hinged. The wire extends half-way around the kettle and is curved to fit snugly on the outside thereof. On top of the lid are secured ears 10 through which the wire passes, whereby the hinge connection is had. The ends of the wire are looped to form spring clamps 11 which engage the bail-ears 6. The clamps have flared ends to facilitate engagement with the ears. These clamps together with the frictional engagement of the wire with the outside of the kettle, securely fastens the wire to the kettle and thus forms a rigid support for the lid. That portion of the wire which passes through the ears 10 is made straight as at 12, and is also offset from the kettle as indicated at 13 to enable the rear ends of the ears 10 to clear the kettle and not interfere with the free swing of the lid.

In the drawing I show the invention applied to a kettle but it is to be understood that it can be applied to pots, pans and like vessels having bail-ears or similar projections. When not needed, the lid can be readily removed by disengaging the clamps 11 from the bail-ears 6.

On top of the lid 9 is a tubular stem 14 which serves as a handle for opening and closing the same. The stem is open at the end to receive a block 15 of cork or other suitable cushioning material which is adapted to strike the outside of the kettle when the lid is thrown open, and thus acts as a buffer and prevents injury to the kettle. At the base of the stem is an opening 16 to admit air and permit water to escape, and projecting into the stem from the opening is a tongue 17 to limit the extent to which the cushion may be inserted into the stem.

I claim:—

1. The combination with a vessel having projections, of a wire extending around the outside of the vessel, and having clamps engageable with the projections and a lid for the vessel hinged on the wire.

2. The combination with a vessel having projections, of a spring wire clamped around the outside of the vessel and having clamps engageable with the projections, a portion of the wire being offset from the vessel, and a lid hinged on the offset portion of the wire.

In testimony whereof I affix my signature, in presence of two witnesses.

HARRY TREVARE DUNSTONE.

Witnesses:
O. L. DAVIDSON,
ROBT. O. DAVIDSON.